May 17, 1932.  S. R. MERLEY ET AL  1,859,241
FORMATION AND RECOVERY OF ALCOHOLS
Filed April 6, 1928
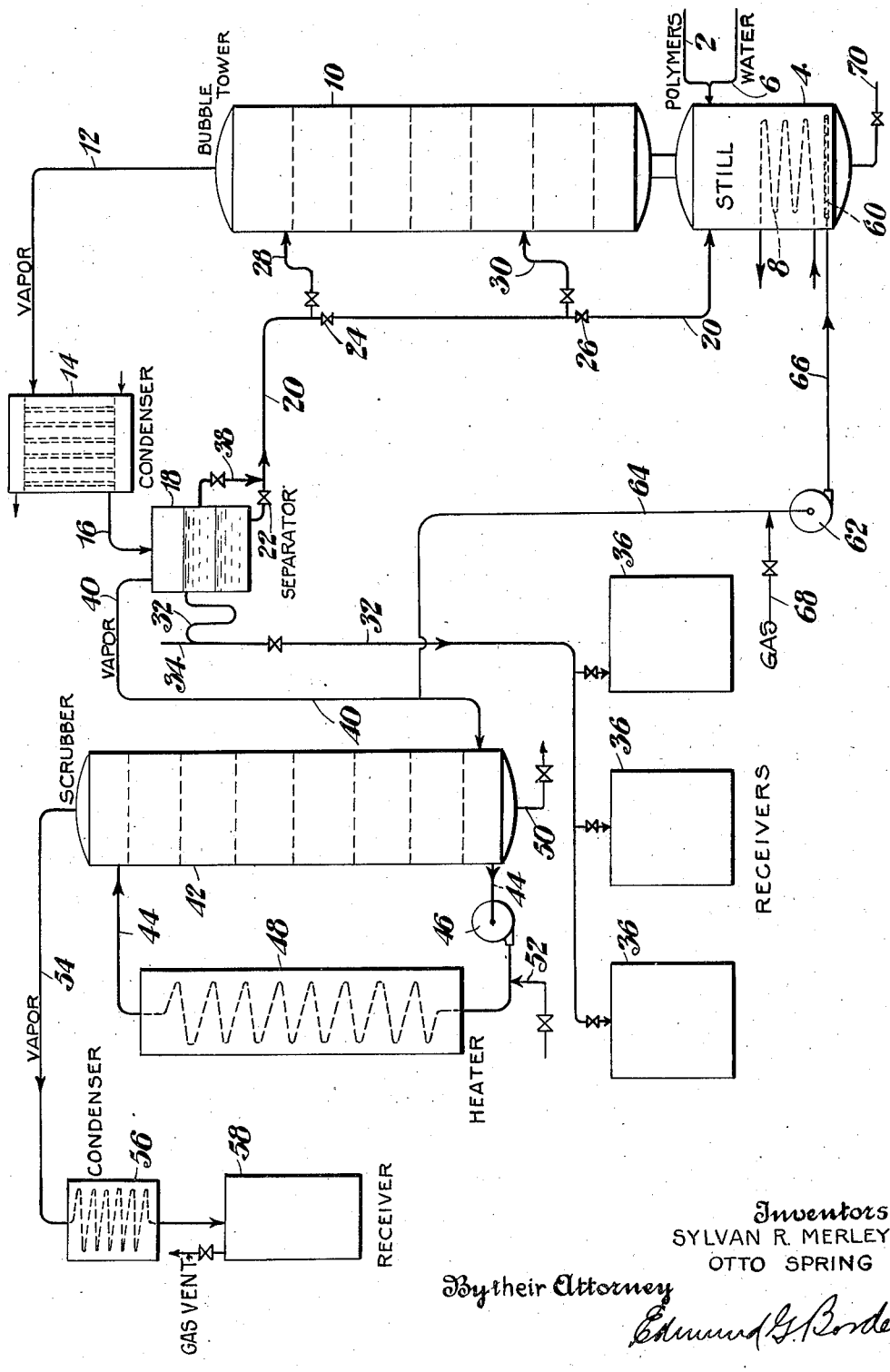
Inventors
SYLVAN R. MERLEY
OTTO SPRING
By their Attorney Patented May 17, 1932

1,859,241

UNITED STATES PATENT OFFICE

SYLVAN R. MERLEY, OF DOVER, NEW JERSEY, AND OTTO SPRING, OF OKMULGEE, OKLAHOMA, ASSIGNORS TO DOHERTY RESEARCH COMPANY, OF NEW YORK, N. Y., A CORPORATION OF DELAWARE

FORMATION AND RECOVERY OF ALCOHOLS

Application filed April 6, 1928. Serial No. 267,868.

The present invention relates to the formation and recovery of alcohols and other organic compounds from products which have been wasted heretofore. More particularly the invention relates to a process and apparatus for the treatment of the polymerized materials produced in the manufacture of alkyl sulphates by the action of sulphuric acid on unsaturated hydrocarbons or on mixtures of such hydrocarbons with saturated hydrocarbons or other materials.

In the manufacture of alcohols from cracked petroleum products, liquid or gaseous, or other materials containing olefins, such materials are treated with more or less concentrated sulphuric acid to form alkyl sulphates. These sulphates are then hydrolyzed by dilution with water in order to form alcohols of the corresponding alkyl groups, which are associated with the sulphuric acid. The alcohols are recovered from the diluted mixture by distillation.

During the absorption and treatment of the hydrocarbon materials with the sulphuric acid considerable quantities of polymerized substances are formed which are separated, as far as possible, from the acid liquor before dilution. Further quantities of polymers separate upon dilution of the liquor and are also removed from the mixture. Heretofore these polymerized substances or polymer bodies have been separated as described and then drained off into the plant sewer as waste material; in fact, attempts to hydrolyze alcohols from the same by ordinary methods have failed.

It has been found, however, that these polymer bodies contain considerable quantities of absorbed or combined alkyl groups which, by the process of the present invention may be converted into the corresponding alcohols.

Therefore the primary object of the present invention is the recovery or production of alcohols from the polymerized materials formed during the treatment of olefin containing substances with sulphuric acid.

With this object in view an important feature of the invention includes the distillation of the polymer bodies in the presence of water for a considerable period of time with or without pressure, constantly returning the distillate to the distilling operation until substantially all of the available alkyl groups have been converted into alcohols.

A further object of the invention is to separate the alcohols produced, from the resulting mixture of alcohols, polymers and water.

A still further object includes the treatment of the light gases and vapors evolved during the distillation or refluxing so as to eliminate the sulphur gases, such as $SO_2$ produced by the decomposition or reduction of the sulphuric acid present in the polymers.

With these objects in view the invention further includes the separation of the alcohols from the reaction mass by distillation and rectification, together with the passage of the light gases and vapors such as ethers and ketones, not condensed with the alcohols, into contact with an alkaline solution such as sodium carbonate solution for the purpose of removing sulphur dioxide therefrom.

A further object of the invention is the provision of an apparatus adapted to carry out the process.

These and other objects of the invention will be apparent from the following detailed description taken in connection with the drawing, in which:—

The figure is a diagrammatic elevational view in the form of a flow sheet embodying the features of the invention and which is particularly adapted for carrying out the novel process.

Referring to the drawing, the polymer bodies to be treated and which have been previously separated from alkyl sulphate liquor either before or after dilution, are introduced through a pipe 2 into a still 4, together with an equal quantity (volume) of water, which is introduced through a pipe 6. The still 4 may be heated by any convenient heating means such as a steam coil 8 shown mounted therein. The vapors produced in the still are passed into a rectifying column 10, which is preferably of the bubble plate reflux type, so that the vapors are repeatedly contacted with condensate and the condensate refluxed back into the still 4. The vapors and gases which are not condensed in the tower 10 are passed by a vapor line 12 into a surface condenser 14, where substantially all of the remainder of the vapors from the still are condensed, the condensate being drained by a pipe 16 into a receiver and separator 18.

During the reflux distillation of any particular batch of polymers being treated, all of the condensate passing into the receiver 18 is returned to the distilling operation by means of a pipe 20 controlled by valve 22. This condensate may be returned directly to the still 4 by completely opening valves 24 and 26 in the line 20, or any part of this condensate may be returned to any desired tray in the tower 10 by means of appropriate valved pipes such as 28 and 30 which connect directly with the pipe 20 above the valves 24 and 26 respectively. Where the condensate returned comprises substantially only the low boiling polymers which distil at about 50° C. they may all be returned to the upper plate of the column 10, so that most of the refluxing is in the column.

In order to recover the best possible yield of alcohols from the polymer material the distillation and refluxing is preferably continued for several hours (from 2 to 6 hours, depending on the pressure). The polymer material cannot be hydrolyzed under the conditions used to hydrolyze the ordinary acid liquor for the production of alcohols, but in accordance with the present invention it has been found that considerable quantities of alcohols may be recovered if the polymers are subjected to reflux distillation for a suitable period of time in the presence of water.

The proper period of refluxing for a particular batch may be determined by experiment, but experience and economy of operation show that it is not profitable to attempt to convert the last traces of hydrolizable material in the mixture. It has been observed, however, that the mixture being treated changes in color from a red, which is characteristic of the original mixture, to a brown at the end of the hydrolysis period. If desired this color change may be used as an indication that the hydrolysis is complete.

During the refluxing and hydrolysis of the polymer water mixture the polymer bodies become increasingly heavier and higher boiling so that at the end of the refluxing period only small amounts of these bodies pass over with the alcohols and water from the column 10.

The use of a superatmospheric pressure on the system during the refluxing treatment decreases the time required to complete the hydrolysis, but also decreases the yield of alcohols. A superatmospheric pressure of 1 to 2 atmospheres decreases the refluxing time about 2 hours.

The alcohols produced from the polymers and present in the mixture at the end of the reflux period are separated from the mixture in the following manner. The heating and distillation of the mixture in the still 4 is continued as before, valve 22 is closed and the condensate is collected in the receiver 18 until two layers are formed, the upper of which comprises the alcohols and the lower the condensed water. These layers are maintained in the separator, the layer of alcohols being decanted off through a liquid sealed overflow pipe 32 which is vented at 34 to prevent siphoning. The pipe 32 leads to a plurality of receiver tanks 36 so that as the distillation progresses the alcohols may be roughly divided according to their boiling temperature, which may be determined by placing a thermometer in the vapor line 12.

The layer of water which separates in the separator 18 is continuously returned to the still 4 or column 10, or both by opening valve 22 enough to accommodate the quantity of water collected. The layers and levels in the separator 18 may be properly adjusted and maintained in accordance with observation made by means of a gauge glass or other suitable well known mechanism not shown.

The returned water layer naturally contains small quantities of dissolved alcohols particularly the lower members of the series such as isopropyl, secondary butyl and amyl, which aid in carrying over the heavier alcohols from the polymer-water mixture in the still. The greater proportion of the alcohols recovered from the polymer materials comprises the secondary and tertiary alcohols containing more than five (5) carbon atoms to the molecule.

At the time valve 22 is closed in order to stratify and separate out the alcohols from the water in separator 18 a small amount of light polymers may come over and collect as a layer on the liquid in the separator. If this happens they are drawn off through a valved pipe 38 and either returned to the still 4 or discharged from the system. This is done before the alcohol layer is permitted to discharge through the pipe 32.

During a run, that is, during both the reflux distillation and subsequent steam distillation there is considerable decomposition of the constituents of the polymers due to the heating and presence of sulphuric acid in the mixture. Some acid is necessary to start the hydrolysis but should not exceed 15%, 5% to 8% being sufficient. This decomposition gives rise to the formation of low boiling ketones, ethers and sulphur dioxide which remain uncondensed in the condenser 14. These materials are therefore withdrawn from the separator 18 through the outlet 40, in the form of a gas or light vapor, and introduced into the lower portion of a scrubber 42, where they are treated with an alkaline solution for the removal of the sulphur dioxide. The scrubber 42 may be of any convenient type such as bubble plate or filled column. With the scrubber is associated a circulating system for withdrawing the alkaline solution from the bottom and introducing it into the top of the scrubber; this comprises a pipe line 44 in which is interposed a circulating pump 46. In order to warm the solution and keep its temperature above the condensing point of the ethers, ketones, etc., in the gas mixture, the pipe 44 is formed into a coil in the heater 48, where the necessary heat may be applied to the solution. Sodium carbonate or hydroxide, or other alkaline solution may be used in the scrubber, and when it becomes saturated a part of it may be withdrawn by a valve pipe 50. Fresh solution may be introduced into the pipe 44 through a valved inlet pipe 52.

The vapors of the purified ethers, ketones, etc., are passed from the scrubber 42 by means of a vapor line 54, condensed in a refrigerated condenser 56, and the condensate collected in a receiver 58.

During that part of the distillation in which the alcohols that have been hydrolyzed from the polymers are being carried over with water and recovered, it has been found advantageous to pass a gas into the mixture in the still to aid in the distillation, since its presence lowers the partial pressure of the alcohol vapors and gives the effect of a vacuum distillation. The use of gas also decreases the decomposition in the mixture being treated. The introduction of gas may be effected by means of the distributor 60 mounted in the lower part of the still 4, and any convenient gas, such as natural gas, stripped cracking still gas or carbon dioxide may be used. Recirculation of the gas through the elements 4, 10, 14 and 18 may be accomplished by connecting vapor line 40 with the intake of a blower 62 as by means of a pipe 64, and connecting the outlet of the blower with the distributor 60 by means of a pipe 66. Instead of using any outside gas as mentioned above the light ethers, ketones, etc., when recirculated through the still and tower have been found to give very satisfactory results; in fact the recirculation of these vapors and gases appears to considerably decrease the formation of decomposition products. This decrease is in part due to the partial pressure effect, but may further be accounted for by application of the "law of mass action", that is, the decomposition is decreased because of the presence in the mixture, of the returned volatile products of decomposition.

Where the gases and vapors produced in the process are recirculated in the distilling system the excess gas may pass on to the scrubber 42 as described above, and the recirculation may be resorted to during the refluxing as well as during the subsequent steam distillation. Where outside gas is used it may be introduced through a valved pipe 68.

After a batch of polymers has been treated and the available alcohol-producing material recovered the residue comprising a mixture of water and heavy polymers is discharged through the drawoff line 70.

The unit comprising the still 4, column 10, condenser 14 and separator 17 may be one of several similar units being operated in different stages of refluxing or distillation, and the circulating pump 62 may serve to supply and/or recirculate gas for all such units. Likewise a single scrubber and its appurtenances may be used to treat the light vapors from all such units, as well as from other distilling and reaction units in the plant. Furthermore the light vapors such as ethers, ketones, etc., produced in the ordinary distillation of alcohols from hydrolyzed alkyl sulphates may be recirculated through such hydrolyzed material and the excess directed to the scrubber 42 and recovered, as described above in connection with the treatment of polymers.

It is to be understood that the features described above constitute a part only of a general plant and process for the recovery of organic compounds from olefin containing materials and that the drawing is merely diagrammatic in character. Furthermore the details of construction of the various elements of the apparatus are not shown since such elements are well known in this or related arts.

In the above description and appended claims the term "hydrolyze" or any of its derivatives when used to apply to the reactions or treatment of the polymerized materials in the units 4 and 10, is not to be understood as limited to its strictly technical meaning, even though the greater portion of the alcohols produced is believed to be formed by the hydrolysis of the di-alkyl sulphates which are dissolved in the oily polymer layer and which cannot be hydrolyzed without being heated in the presence of sulphuric acid.

As stated above, some acid is added to start the reaction, but that formed in the hydrolysis will be sufficient to maintain the reaction without further additions of acid. However, the concentration of the sulphuric acid should not be permitted to rise so high as to dehydrate the tertiary alcohols as they are formed in the heated mixture.

Having thus described the invention, what is claimed as new is:

1. In the process of manufacturing alcohols from olefinic materials, in which such materials are reacted on with concentrated acid and the resulting acid liquor is mixed with water to hydrolyze the absorbed olefins to alcohols and acid, and in which a layer of polymers separates on the hydrolyzed materials, the improvement, which comprises separating said polymers from the remaining materials, mixing water with said polymers, and subjecting the mixture to reflux distillation for a considerable period of time to hydrolyze alcohols therefrom.

2. In the process for recovering alcohols from olefins in which olefin material is absorbed in sulphuric acid, and the resulting acid liquor separated from polymerized materials and hydrolyzed, the improvement which comprises subjecting the polymerized materials in admixture with an equal volume of water to reflux distillation to hydrolyze alcohols from said materials, continuing said hydrolysis until substantially all available materials are converted, and separating the alcohols from the resulting mixture by fractional distillation.

3. The process of producing alcohols from the polymerized materials formed in the production of alkyl sulphates from olefins and sulphuric acid, which comprises separating said polymer material from the acid liquor, adding water to said material and subjecting the resulting mixture to reflux distillation to hydrolyze alcohols therefrom, and separating the alcohols from said mixture.

4. The process of obtaining alcohols from the polymer materials produced in the manufacture of organic compounds from olefin-bearing materials, which comprises separating said polymers from the materials with which they occur, mixing water with said polymers and subjecting the mixture to reflux distillation to hydrolyze the available alcohol forming materials therein to alcohols, steam distilling the alcohols from the mixture, condensing the mixed vapors of alcohols and water, separating the condensed water from the alcohols, and returning the water to the distilling zone.

5. In the process of manufacturing organic compounds from olefin containing materials, in which such materials are treated with concentrated acid and polymerized products are formed, the improvement, which comprises separating the polymer material from the acid reaction material and mixing it with an equal volume of water in a still, subjecting the mixture to reflux distillation for a considerable period of time to convert the available alcohol forming material into alcohols, and upon completion of the hydrolysis distilling off the alcohols from the water and polymer material.

6. The treatment of the polymerized materials produced in reacting on olefins with strong acid, which comprises mixing said materials with water and subjecting the mixture to reflux distillation for a period of time sufficient to hydrolyze substantially all the hydrolyzable compounds therein, and returning all of the reflux condensate to the distilling zone during said period of hydrolysis.

7. In the process of producing alkyl sulphates from olefin material and sulphuric acid in which a layer of polymerized materials separates on the acid liquor, the improvement, which comprises separating said polymer layer from the acid liquor, subjecting the separated polymer layer to reflux distillation in contact with water for a period of time sufficient to hydrolyze the available alcohol forming materials therein, and separating the alcohols thereby produced from the remaining polymer material.

8. In the process of producing alcohols from olefin containing materials in which such materials are treated with sulphuric acid and in which a layer of polymer bodies is formed, the improvement which comprises mixing said polymer layer with water and subjecting the resulting mixture to reflux distillation, passing a portion of the gases and light vapors evolved in the process through the mixture being distilled, passing the remaining portion of the light volatiles and gases into contact with an alkaline solution to remove any sulphur dioxide present therein and condensing the remaining light volatiles.

9. In the treatment of olefin containing materials for the production of alcohols in which such materials are reacted upon with sulphuric acid and the polymer layer portion of the resulting mixture is hydrolyzed with water, the improvement which comprises separating the alcohols from the hydrolyzed mixture by distillation, and aiding such separation by passing a gas through the hydrolyzed mixture being distilled.

SYLVAN R. MERLEY.
OTTO SPRING.